Patented Nov. 30, 1948

2,455,172

UNITED STATES PATENT OFFICE 2,455,172

PRODUCTION OF 2-MONOSUBSTITUTED PYRIMIDINES

George W. Hearne, El Cerrito, Theodore W. Evans, Oakland, and Harry L. Yale, Berkeley, Calif., assignors to Shell Development Company, San Francisco, Calif., a corporation of Delaware No Drawing. Application January 26, 1948, Serial No. 4,468

11 Claims. (Cl. 260—251)

This invention relates to a new reaction of acetals of propargyl aldehyde, and to a method of effecting the reaction. More particularly, the present invention relates to a new and unexpected reaction of acetals of propargyl aldehyde with compounds which contain the cationic guanyl group

to form mono-substituted pyrimidines in which the substituent group is attached to the carbon atom in the 2-position of the pyrimidine ring. In a preferred embodiment, the invention relates to a new and unexpected reaction of the acetals of propargyl aldehyde whereby the acetals may be reacted with salts of guanidine to form the valuable heterocyclic base, 2-aminopyrimidine.

It is known that when propargyl aldehyde diethyl acetal is reacted with urea

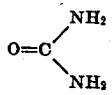

in very dilute hydrochloride acid, there are formed high molecular weight condensation products from which the acyclic compounds represented by the formulas $H_2N—CO—NH—CH(C≡CH)—NH—CO—NH_2$ and $H_2N—CO—NH—CH(C≡CH)—NH—CO—$
$NH—CH(C≡CH)—NH—CO—NH_2$ may be isolated. As far as we know these products, which are relatively insoluble in many of the common solvents and which melt at high temperatures, have been regarded as products of only laboratory interest and have not been found to have value for utilization in the commercial arts.

In accordance with the present invention, it unexpectedly has been discovered that valuable products having a high degree of commercial utility may be prepared by treating acetals of propargyl aldehyde in a substantially anhydrous strongly acidic condensation medium with a nitrogenous organic salt which contains the cationic guanyl group

or a group that is transformed to the cationic guanyl group under the reaction conditions. The products, which are produced in accordance with the new reaction upon which the invention is based are very different from the aforementioned known products that have been prepared by the reaction of the diethyl acetal of propargyl aldehyde with urea in dilute hydrochloric acid. Furthermore, the products of the present process differ distinctly from those which would be expected on the basis of analogy with the above-mentioned known reaction to be formed by the reaction of an acetal of propargyl aldehyde with a compound containing the said cationic guanyl group. For example, instead of the linear oxygen-containing condensation products which, by analogy with the above known reaction, could be expected to be formed by the reaction of an acetal of propargyl aldehyde with a guanidine salt, it has been surprisingly discovered that there may be prepared in excellent yields the valuable heterocyclic amine, 2-aminopyrimidine. This known compound has been employed extensively as an intermediate for the preparation of chemotherapeutically active compounds. In contrast to the above known reaction of acetals of propargyl aldehyde, the reaction which forms the principle of the present invention enables the preparation of useful and valuable organic compounds. Compounds other than salts of guanidine containing the cationic guanyl group may be reacted according to the invention with acetals of propargyl aldehyde to form other monosubstituted pyrimidines in which the substituent group is attached by a univalent bond to the carbon atom in the 2-position of the pyrimidine ring. These other products whose production is within the generic scope of the invention include valuable compounds which are useful as a pharmacologically active compound or as intermediates for the preparation of pharmacologically active compounds, as organic nitrogenous bases for special applications, as special solvents, as intermediates for the preparation of compounds useful in the compounding and curing of rubber, and in like applications.

The new reaction which is the subject of the present invention is regarded as generic to the acetals of propargyl aldehyde. Accordingly, any suitable acetal of propargyl aldehyde may be employed in the process without exceeding the generic scope of the invention. Although the detailed mechanism of the new reaction is not known, the overall reaction appears to be approximately as represented in the following equation

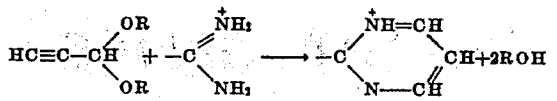

In this equation, the first formula on the left represents the acetal of propargyl aldehyde, R representing a hydrocarbon group. It will be observed that the groups represented by —OR do not form a part of the heterocyclic production of the reaction, but that they appear on the right hand side of the equation in the form of the corresponding hydroxylic compound. The selection of the particular acetal of propargyl aldehyde to which the reaction is applied is, in general, not highly critical, and frequently may be determined primarily by the practical consideration of availability of the acetal. However, certain preferred groups of acetals exist because of the particular efficacy with which they may be employed in the process of the invention. Generally speaking, the hydrocarbon groups that are represented by R may be either acyclic or they may contain one or more carbocyclic groups of atoms. They may contain only univalent carbon-to-carbon bonds or they may contain one or more carbon-to-carbon multiple bonds which may be either aliphatic or aromatic in character. Those acetals of propargyl aldehyde in which R represents an alkyl group, such as a lower alkyl group, are particularly desirable for use in the process of the invention. Acetals of propargyl aldehyde within this preferred group include, for example, the dimethyl acetal, the diethyl acetal, the dipropyl acetal, diisopropyl acetal, the butyl acetals, the hexyl acetals, and the like, the diethyl acetal being particularly preferred. The two groups represented by R may be the same or they may be different, although for practical reasons it is preferred that the two groups represented by R be the same because of the somewhat greater ease with which they may be prepared or obtained. Because of their availability and their outstanding adaptability to use in the process of the invention, it generally is most convenient and advantageous to employ those acetals of propargyl aldehyde in which the groups represented by R in the foregoing formula are alkyl groups containing from one to about four carbon atoms.

When in accordance with the preferred embodiment of the invention, the reaction and the process for effecting the same as directed to the preparation of 2-aminopyrimidine, the overall reaction is thought to proceed approximately as follows

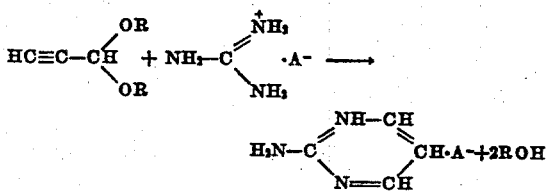

In this equation there is employed for the purpose of illustration a guanidine salt of a monovalent acid which forms the anion A⁻. There also may be employed with equivalent results salts of guanidine with divalent or even trivalent acids. Generally speaking, the guanidine salt may be one of any suitable acid, which acid may be either inorganic or organic in nature. Guinidine salts which thus may be employed in the process of the invention include, for example, the hydrochloride, the hydrobromide, the nitrate, the sulfate, the oxalate, the carbonate, the acetate and the like. Guanidine salts of other acids which may be employed without exceeding the generic scope of the invention include the guanidine salts of acids such as of the chloroacetic acids, pyrophosphoric acid, nitrous acid, phosphorous acid, succinic acid, and the like. When the reaction is effected, as hereinafter described, in an organic solvent medium, it is desirable to employ a guanidine salt that has a substantial solubility in the organic solvent under the reaction conditions. It is preferred to employ a strong mineral acid salt of guanidine, such as the sulfate, the hydrochloride, or the nitrate, the nitrate being particularly preferred.

In accordance with the generic concepts of the invention, acetals of propargyl aldehyde may be treated with salts of organic nitrogenous bases other than guanidine, which salts contain the cationic guanyl group

to prepare monosubstituted pyrimidines in which the substituent group is bonded by a univalent bond to the carbon atom in position No. 2 of the pyrimidine ring. The invention in its generic concepts thus includes the reaction of acetals of propargyl aldehyde, and a method for effecting the said reaction, with salts of substitued guanidines

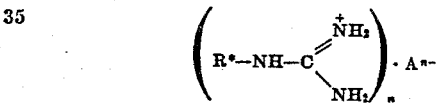

of dicyandiamidine or guanylurea

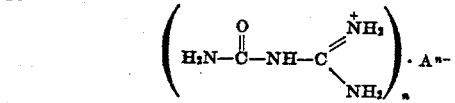

of thiodicyandiamidine or guanylthiourea

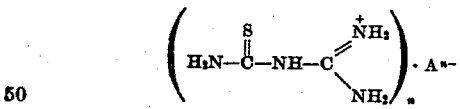

of substituted dicyandiamidines and substituted thiodicyandiamidines within the present class, of O-substituted isoureas

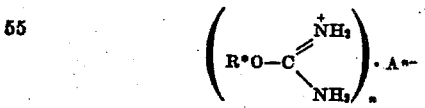

of S-substituted isothioureas

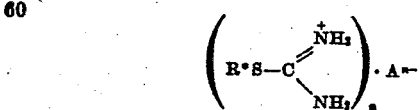

i. e., salts of the isoureas and the isothioureas in which the hydrogen atom attached to the O or the S atom, respectively, has been replaced by a hydrocarbon group, such as an alkyl or an aryl group, of acetamidine and its homologs and their analogs

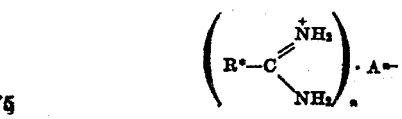

and with equivalent amidines which in the form of their salts, contain the cationic guanyl group. In the above formulas, R* represents a hydrocarbon group, such as an aliphatic or an aromatic hydrocarbon. $A^{n-}$ represents an anion having the valence $n-$ that is derived from the acid that is reacted with the free guanyl base to obtain the desired salt. Generally speaking, the anion $A^{n-}$ may be the anion of any of the acids or of any of the guanidine salts referred to in the immediately preceding paragraph.

It has been discovered that the novel reaction of the acetals of propargyl aldehyde may be effected by treating the acetal with the said organic salt containing the cationic guanyl group in a substantially anhydrous organic medium in the presence of an acidic condensation catalyst. As the acidic condensation catalyst there may be employed any suitable organic or inorganic acid, or acid-reacting compound, which serves to promote the desired condensation reaction. Suitable acid-reacting condensation catalysts which may be employed include, for example, free acids, acid-reacting salts, substances which react in situ to form an acid, and the like. Suitable free acids which may be employed include, among others, hydrogen chloride, hydrogen bromide, orthophosphoric acid, pyrophosphoric acid, sulfuric acid, sulfurous acid, selenic acid, selenious acid, the mono-, di-, and trihaloacetic acids, and the like. Acid-reacting substances which may be employed include, among others, acid-reacting salts such as potassium dihydrogen orthophosphate, sodium acid sulfate, and the like. Acid-reacting substances which rely on the presence of water for exhibition or development of their acid characteristics, e. g., zinc chloride, aluminum sulfate, magnesium chloride, and the like, are less desirable for use as the acidic condensation catalyst, although they occasionally may be employed by adding to the reaction mixture sufficient water to liberate acid as by their hydrolysis.

Although acidic condensation catalysts of numerous types thus may be employed in accordance with the broadest conception of the invention, it is particularly advantageous to employ as the acidic condensation catalyst a strong mineral acid, such as hydrogen chloride, sulfuric acid, hydrogen bromide, phosphoric acid, and the like. Hydrogen chloride is preferred. In order to simplify the subsequent recovery and purification of the desired product it may be advantageous to employ as the acidic condensation catalyst the acid from which the anion $A^{n-}$ is derived, although it is not a prerequisite to the successful execution of the process to do so. The new reaction may be effected with particularly advantageous results in strongly acidic reaction media, such as concentrated solutions of the acidic condensation catalyst in a suitable organic solvent. Because of the ease with which the acid concentration may be regulated, it is especially convenient and desirable to effect the reaction in a saturated solution of a hydrohalogen acid, preferably hydrochloric acid, in the organic solvent.

The reaction medium in the process of the invention may be any suitable substantially anhydrous organic solvent in which the reactants are dispersible, or soluble. Organic solvents such as hydrocarbons, halogenated hydrocarbons, ethers, esters, alcohols, heterocyclic solvents, e. g., dioxane, and the like, may be employed in accordance with the generic concepts of the invention. Not all of the solvents are necessarily applicable in all cases because of the obvious limitations that may be imposed by the different solubilities of the several possible reactants in various organic solvents. It has been discovered that the alcohols, particularly the water-miscible alkanols are exceptionally desirable and efficacious as the reaction media, ethyl alcohol because of its low cost and its adaptability to the objects of the invention, being preferred. Other specific alcohols which may be employed include methyl alcohol, propyl alcohol, isopropyl alcohol, the butyl alcohols, and the like. The condensation reaction may be effected by treating the propargyl aldehyde acetal with the nitrogenous reactants in the highly acidic reaction medium at a temperature generally from about 0° C. to about 125° C., preferably from about 0° C. to about 50° C. The reaction may be effected by dissolving or dispersing the acetal in a solution of the acidic condensation catalyst in the organic solvent and adding to the resultant mixture, either at one time or in several portions, the nitrogenous salt of the hereinbefore defined character. Instead of adding the previously prepared nitrogenous salt to the mixture, enough acid may be provided to form in situ the desired salt, and the free guanyl base may be added to the mixture. The preferred procedures for effecting the reaction comprise preparing a solution or dispersion of the guanyl salt in the organic reaction medium containing the condensation catalyst, and adding the propargyl aldehyde acetal with agitation to the mixture. During the reaction heat may be liberated. The temperature of the reaction mixture desirably is maintained within reasonable limits, during the reaction. This may be accomplished by the provision of suitable cooling means such as cooling coils within the reaction vessel, or the rate of addition of the second reactant may be so controlled as to prevent excessive rise in temperature. During the reaction the reaction mixture may be agitated, if desired, to facilitate more intimate mixing of the reactants. Additional amounts of the condensation catalyst may be added during the course of the reaction to insure the presence of a sufficient amount of the catalyst at all times. Prolonged reaction times are not necessary, the reaction ordinarily being complete within less than 12 hours and generally within less than 6 hours.

After completion of the reaction, the monosubstituted pyrimidine exists in the reaction mixture in the form of a salt thereof. Since the conversion of pyrimidine salts to the free base is well understood in the art and readily can be accomplished by those skilled in the art to which the invention pertains, it will be understood that when referring to the product as a mono-substituted pyrimidine we do not intend to distinguish between the product as it may exist in the form of its salt and in the free state. If the free base is desired as the ultimate product of the process, the reaction mixture thus may be treated in any suitable manner to recover the desired free base therefrom. One effective method comprises rendering the reaction mixture alkaline, as by addition of the necessary amount of a caustic alkali, and extracting the liberated pyrimidine base by treatment with a selective solvent. Alternatively, in suitable cases the organic solvent in the reaction mixture and the condensation catalyst may be removed as by evaporation or distillation. The remaining residue which comprises the pyrimidine salt formed by the reaction may be further treated according to methods which will be apparent to those skilled in the art to recover and/or purify the desired product. After the initial separation of the crude reaction product, it may be further purified to any desired extent according to any known method, such as by distillation, by recrystallization, by treatment with selective solvents, and in like ways.

The following examples will illustrate certain of the specific embodiments of the invention. It will be understood that the examples are intended to be illustrative of the invention defined more broadly in the appended claims and not as limitations thereon.

*Example I*

Hydrogen chloride gas is passed at room temperature into 4300 parts of ethyl alcohol until a saturated solution is formed. To this solution there are added 227 parts of guanidine nitrate. The mixture is stirred and 138 parts of the diethyl acetal of propargyl aldehyde are added slowly, during the addition the temperature being maintained at about 15°–20° C. by cooling. During the reaction the mixture is kept saturated with hydrogen chloride by intermittent passage of a stream of hydrogen chloride gas thereinto. The mixture is allowed to stand at a temperature of about 20° C. for four hours and then is heated to about 60° C. for an additional two hours. The ethyl alcohol and excess hydrogen chloride then are removed by evaporation. The residue from the evaporation is rendered strongly alkaline by addition of concentrated aqueous sodium hydroxide solution and is extracted with benzene. Pyrimidine hydrochloride is precipitated from the benzene solution by addition of hydrogen chloride gas. Excellent yields of 2-aminopyrimidine in the form of its hydrochloride are obtained.

*Example II*

Acetamidine and the diethyl acetal of propargyl aldehyde, in a molar ratio of 3.8:1, respectively, are reacted as in the foregoing example in a concentrated ethanolic solution of hydrogen chloride, at an initial temperature of 15° C. and a final temperature of 45° C. After ten hours the solvent and excess hydrogen chloride are removed by evaporation and the residue is worked up in a manner similar to the method used in the preceding example. 2-methylpyrimidine hydrochloride is obtained in satisfactory yield. The picrate of the 2-methylpyrimidine is prepared and found to melt at about 105.5° to 106.5° C.

*Example III*

The diethyl acetal of propargyl aldehyde and the hydrochloride of S-methylisothiourea when reacted in a concentrated ethanolic solution of hydrogen chloride in a manner similar to the foregoing examples forms 2-methylmercaptopyrimidine in satisfactory yields. The hydrochloride of the 2-methylmercaptopyrimidine is recrystallised and found to melt at about 142° C. to 144° C.

The claimed invention is:

1. Process which comprises reacting propargyl aldehyde diethyl acetal with guanidine nitrate in a substantially anhydrous acidic liquid medium to produce a salt of 2-aminopyrimidine as the principal product of the reaction.

2. Process which comprises reacting propargyl aldehyde diethyl acetal with a guanidine salt in an acidic alcoholic liquid medium to produce a salt of 2-aminopyrimidine as the principal product of the reaction.

3. Process which comprises reacting an acetal of propargyl aldehyde with a guanidine salt in a strongly acidic organic solvent medium to produce a salt of 2-aminopyrimidine as the principal product of the reaction.

4. Process which comprises adding propargyl aldehyde diethyl acetal to a dispersion of a guanidine salt in a strongly acidulated organic solvent and after reaction has ensued recovering 2-aminopyrimidine from the mixture.

5. Process which comprises reacting an acetal of propargyl aldehyde with a salt of guanidine in an organic solvent medium in the presence of an acidic condensation catalyst and recovering as the principal product of the reaction a salt of 2-aminopyrimidine.

6. Process which comprises reacting an acetal of propargyl aldehyde with a guanidine salt in a saturated solution of a hydrogen halide in an alcohol to produce a salt of 2-aminopyrimidine as the principal produce of the reaction.

7. Process which comprises reacting propargyl aldehyde diethyl acetal with an organic salt containing the cationic guanyl group in a concentrated solution of hydrogen chloride in ethanol to produce a pyrimidine base monosubstituted at the 2-position of the pyrimidine ring as the principal product of the reaction.

8. Process which comprises reacting a lower aliphatic acetal of propargyl aldehyde with a strong mineral acid salt of guanidine in a concentrated solution of a normally gaseous strong mineral acid in an alcohol to produce a salt of 2-aminopyrimidine as the principal product of the reaction.

9. Process which comprises reacting an acetal of propargyl aldehyde with a strong mineral acid salt of a guanyl base, said salt containing the cationic guanyl group, in a strongly acidulated organic solvent medium to produce a salt of a pyrimidine monosubstituted in the 2-position of the pyrimidine ring as the principal product of the reaction.

10. Process which comprises reacting a lower aliphatic acetal of propargyl aldehyde with a strong mineral acid salt of a guanyl base, said salt containing the cationic guanyl group, in an organic solvent medium in the presence of an acidic condensation catalyst to produce as the principal product of the reaction a salt of a pyrimidine monosubstituted in the 2-position of the pyrimidine ring as the principal product of the reaction.

11. Process which comprises treating an acetal of propargyl aldehyde with a salt of a guanyl base, said salt containing the cationic guanyl group, in an organic medium in the presence of an acidic condensation catalyst and recovering as the principal product of the reaction a pyrimidine monosubstitute in the 2-position of the pyrimidine ring.

GEORGE W. HEARNE.
THEODORE W. EVANS
HARRY L. YALE.

No references cited.